(12) United States Patent
Rawson, III (10) Patent No.: US 6,502,141 B1
(45) Date of Patent: Dec. 31, 2002

(54) METHOD AND SYSTEM FOR APPROXIMATE, MONOTONIC TIME SYNCHRONIZATION FOR A MULTIPLE NODE NUMA SYSTEM

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,679

(22) Filed: Dec. 14, 1999

(51) Int. Cl.[7] .............................................. G06F 1/12
(52) U.S. Cl. ...................................... 709/400; 713/400
(58) Field of Search ............................... 713/400, 401; 709/248, 400

(56) References Cited

U.S. PATENT DOCUMENTS

| | | | | |
|---|---|---|---|---|
| 4,807,259 A | * | 2/1989 | Yamanaka et al. | 375/109 |
| 4,816,989 A | * | 3/1989 | Finn et al. | 364/200 |
| 5,535,217 A | * | 7/1996 | Cheung et al. | 370/100.1 |
| 5,689,688 A | * | 11/1997 | Strong et al. | 395/553 |
| 5,907,685 A | * | 5/1999 | Douceur | 395/200.78 |
| 5,982,828 A | * | 11/1999 | Fujimori et al. | 375/356 |
| 6,157,957 A | * | 12/2000 | Berthaud | 709/248 |
| 6,324,586 B1 | * | 11/2001 | Johnson | 709/248 |

* cited by examiner

Primary Examiner—Thomas M. Heckler (57) ABSTRACT

In a multi-node non-uniform memory access (NUMA) multi-processor system, a designated node synchronization processor on each node, is synchronized. Individual nodes accomplish internal synchronization of the other processors on each node utilizing well known techniques. Thus it is sufficient to synchronize one processor on each node. Node zero, a designated system node that acts as a synchronization manager, estimates the time it takes to transmit information in packet form to a particular, remote node in the system. As a result a time value is transmitted from the remote node to node zero. Node zero projects the current time on the remote node, based on the transmission time estimate and compares that with its own time and either updates its own clock to catch up with a leading remote node or sends a new time value to the other node, requiring the remote node to advance its time to catch up with that on node zero. Code on the remaining nodes is mostly passive, responding to packets coming from node zero and setting the time base value when requested. Monotonicity of the time bases is maintained by always advancing the earliest of the two time bases so as to catch up with the later one.

19 Claims, 4 Drawing Sheets

Fig. 1

Wait for the next cross-node interval $X_i$, i = 1, ..., n
    to expire.
Assume that $X_k$ expires first.
Calculate $RTT_k$, the current round-trip time to node k
    using the method of Figure 3.
If no valid $RTT_k$ is generated, restart the wait for $X_k$
    and return to the beginning for the next $X_i$ to expire.
Get $T_k$, the current time on k, from the last round-trip
    packet received.
$CT_k$, the current time on k, is $T_k + RTT_k/2$.
If $T_0 => CT_k$
    Reread the value of $T_0$
    Send a new time base value for k of $T_0 + RTT_k/2$.
        to node k.
else
    Set the time base value of node 0 to $CT_k$.
DIFF = $|T_0 - CT_k|$
If (DIFF < LTHRES)
    $X_k = X_k$ * XNLESS
If (DIFF > UTHRES)
    $X_k = X_k$ / XNMORE
Restart the wait for $X_k$ and loop back to wait for the next $X_i$ to expire.

<u>Where node k is other than zero:</u>

Respond to the RTT estimation packets placing the
    current $T_k$ in each one before returning it.
When a set time packet is received, set $T_k$ to the value
    contained in it.

*Fig. 2*

Set $RTT_k$ to 0.
Do n times
    Set TS to the time sent.
    Send an estimating packet to node k.
    Wait for the returning packet to arrive.
    Set RTT to arrival time - TS.
    If RTT is not valid
        Return indicating that $RTT_k$ cannot be estimated.
    $RTT_k = RTT_k + RTT$
Set $RTT_k = RTT_k/n$.

To check if RTT is valid:

If $(RTT < MIN_{rtt})$
    return RTT invalid
If $(RTT < E_{rtt} + 3 * STD_{rtt})$
    return RTT invalid
If $(RTT > E_{rtt} + 3 * STD_{rtt})$
    return RTT invalid
Return RTT valid

To respond to the estimating packets on node k:

On receipt of an estimating packet, put $T_k$ in packet and
    send back to node 0.

METHOD AND SYSTEM FOR APPROXIMATE, MONOTONIC TIME SYNCHRONIZATION FOR A MULTIPLE NODE NUMA SYSTEM

BACKGROUND OF THE INVENTION

1. Technical Field

The present invention relates in general to a data processing system and in particular to a multi-processor data processing system. Still more particularly, the present invention relates to scalable shared memory multi-processor data processing systems.

2. Description of the Related Art

Symmetrical multiprocessing (SMP) and Non-Uniform Memory Access (NUMA) architecture are scalable data processing technologies that utilize multiple processors and shared memory to handle large applications or multiple applications at the same time. Scalable shared memory multi-processors are often built by interconnecting symmetric shared memory multi-processor systems with relatively small numbers of processors per system with an interconnect that maintains cache coherency. Doing so makes good use of other, pre-existing and often high volume products to create larger systems. The result is a cache-coherent non-uniform memory access multi-processor. (ccNUMA or simply NUMA). In addition, some architectures such as the PowerPC™ (a product of International Business Machines of Armonk, N.Y.) provide individual processor time registers that increment at some divisor of the processor's own frequency—on the PowerPC the register is called the "time base register." The PowerPC architecture requires that the program-perceptible values of the time base on a multi-processor system increase monotonically, meaning that if a program reads the time base and then reads it again, the second value must be greater than or equal to the first value.

The values of the time base registers on multiple processors have to be close enough to each other that if a program runs first on one processor and then on another, the program reads a second time base value that is greater than or equal to the first one. The time to move a program from one processor to another is greater than $10^3$ processor cycle times and the time base divisor is on the order of tens of cycles, which will force a multi-node NUMA system to synchronize the time base registers of all the processors in the system, to within approximately $10^2$ time base ticks of each other. Time will be expressed in this disclosure in units of the time base cycles or values and the terms "cycle" and "tick" are used interchangeably.

There is often no common oscillator on a NUMA system and the time base registers drift apart from each other over time so the time base registers must also be re-synchronized with each other periodically. Although some hardware interconnection mechanisms do have a common oscillator that can be used for this purpose and others have a special packet format that carries a time value in its payload and ages this value as it is transmitted through the network, such hardware is not always present. Thus, some mechanism using standard hardware and appropriate logic is required. While time base synchronization is important, it must not be too expensive in terms of network load or specialized hardware. However, a time base synchronization mechanism to maintain the required level of synchronization is still needed.

It would be desirable, therefore, to provide a time base synchronization system for a multi-node NUMA multi-processor system. It is further desirable that the synchronization system be used with current interconnect implementations requiring no specialized hardware features. It would also be desirable to provide the synchronization system without imposing significant overhead on either the interconnect or the processors within the system.

SUMMARY OF THE INVENTION

It is therefore one object of the present invention to provide a time base synchronization system for a multi-node NUMA multi-processor system that will utilize available interconnect implementations without requiring specialized hardware features.

It is another object of the present invention to provide a time base synchronization system for a multi-node NUMA multi-processor system that does not impose significant operating overhead on the interconnect or processors in the system.

The foregoing objects are achieved as is now described. In a multi-node non-uniform memory access (NUMA) multi-processor system, a designated node synchronization processor on each node, is synchronized. Individual nodes accomplish internal synchronization of the other processors on each node utilizing well known techniques. Thus it is sufficient to synchronize one processor on each node. Node zero, a designated system node that acts as a synchronization manager, estimates the time it takes to transmit information in packet form to a particular, remote node in the system. As a result a time value is transmitted from the remote node to node zero. Node zero projects the current time on the remote node, based on the transmission time estimate and compares that with its own time and either updates its own clock to catch up with a leading remote node or sends a new time value to the other node, requiring the remote node to advance its time to catch up with that on node zero. Code on the remaining nodes is mostly passive, responding to packets coming from node zero and setting the time base value when requested. Monotonicity of the time bases is maintained by always advancing the earliest of the two time bases so as to catch up with the later one.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
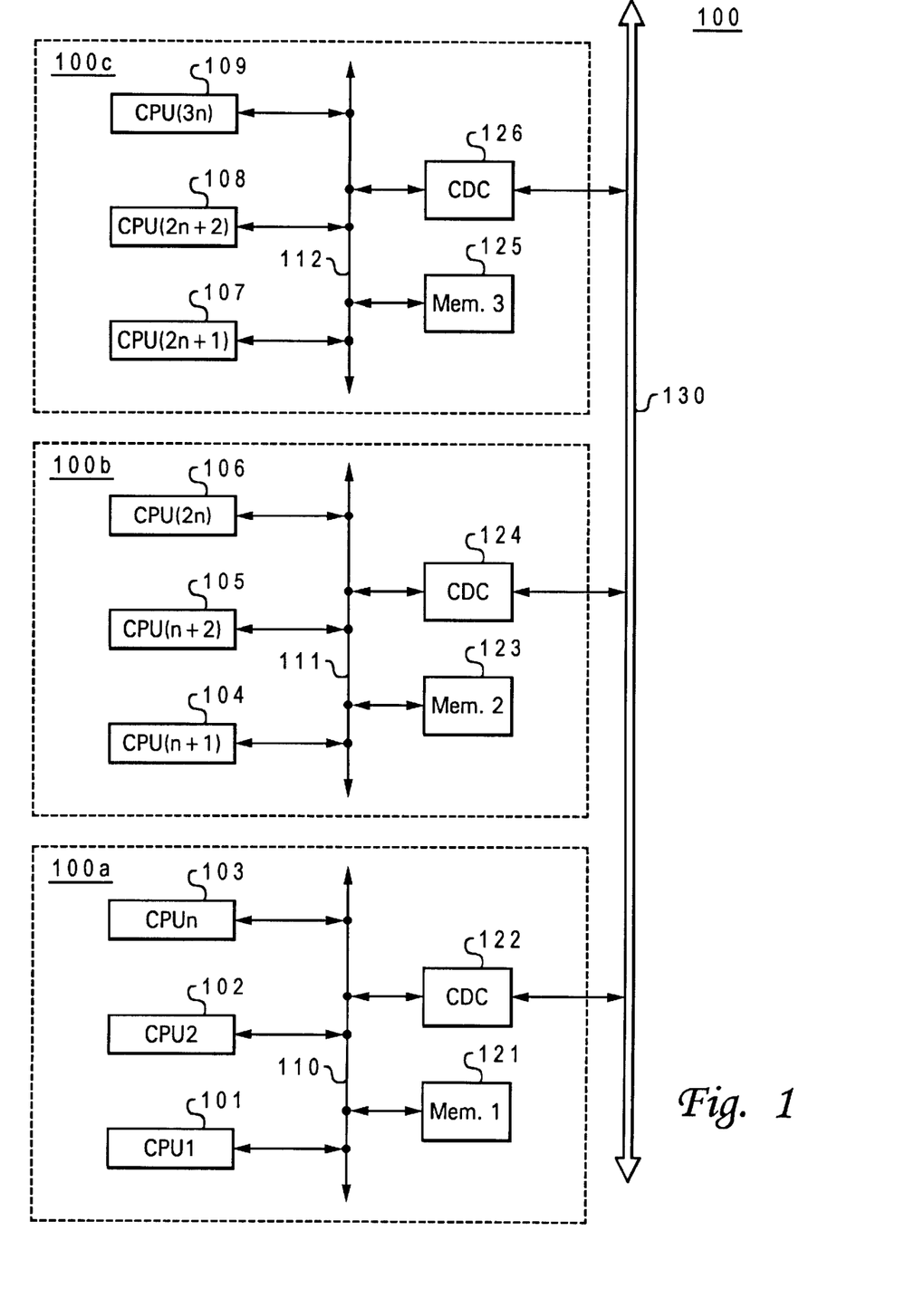
FIG. 1 depicts a high level block diagram of three nodes of a multi-node configuration of a data processing system in which a preferred embodiment of the present invention may be implemented.

With reference now to the figures, and in particular with reference to FIG. 1, a high-level block diagram of three nodes of a multi-node configuration of a data processing system in which a preferred embodiment of the present invention may be implemented, is depicted. Data processing system 100 is composed of multiple nodes of which three nodes 100a, 100b and 100c are depicted. The nodes are connected together by interconnect 130. Each node has local bus 110, 111 and 112; one or more microprocessors (CPUs) per node, and memories 121, 123 and 125 connected to each local bus 110, 111 and 112. Cache and Directory Controllers (CDC) 122, 124 and 125 are also connected to local bus 110, 111 and 112, and interconnect 130. The general operation of data processing systems as depicted in FIG. 1 is understood by those of ordinary skill in this art.

Data processing system 100 depicts only three nodes: 100a, 100b and 100c. Each node utilizes multiple processors for each node and a typical NUMA system would utilize more nodes. It will be understood that there may be more than two, three or more microprocessors on any local bus and there may be two, three or more nodes on interconnect 130. A system bus may also be implemented in a number of different ways from a classic backplane bus to a full crossbar switch or any other viable connection scheme.

A key property of a NUMA data processing system is that combined memories 121, 123 and 125 are treated as a single address space. Memory 1 121 may hold addresses from 0 to 4000 (address location numbers are strictly for illustration and do not necessarily represent actual memory addresses) and Memory 2 123 may hold addresses from 4001 to 10000. When CPU2 102 needs to access memory location 5000, for example, CDC 122 on node 100a routes the request to interconnect 130 and CDC 124 on node 100b receives the request from the interconnect 130 and routes it to Memory 2 123. Any memory on the NUMA system is available to any node and node 100a may access node 100c as well. Memory on the same node as a CPU is termed "local memory" and memory on a different node is termed "remote memory." Nodes do not need to all have the same amount of memory or the same number of CPUs.

Figure 2:
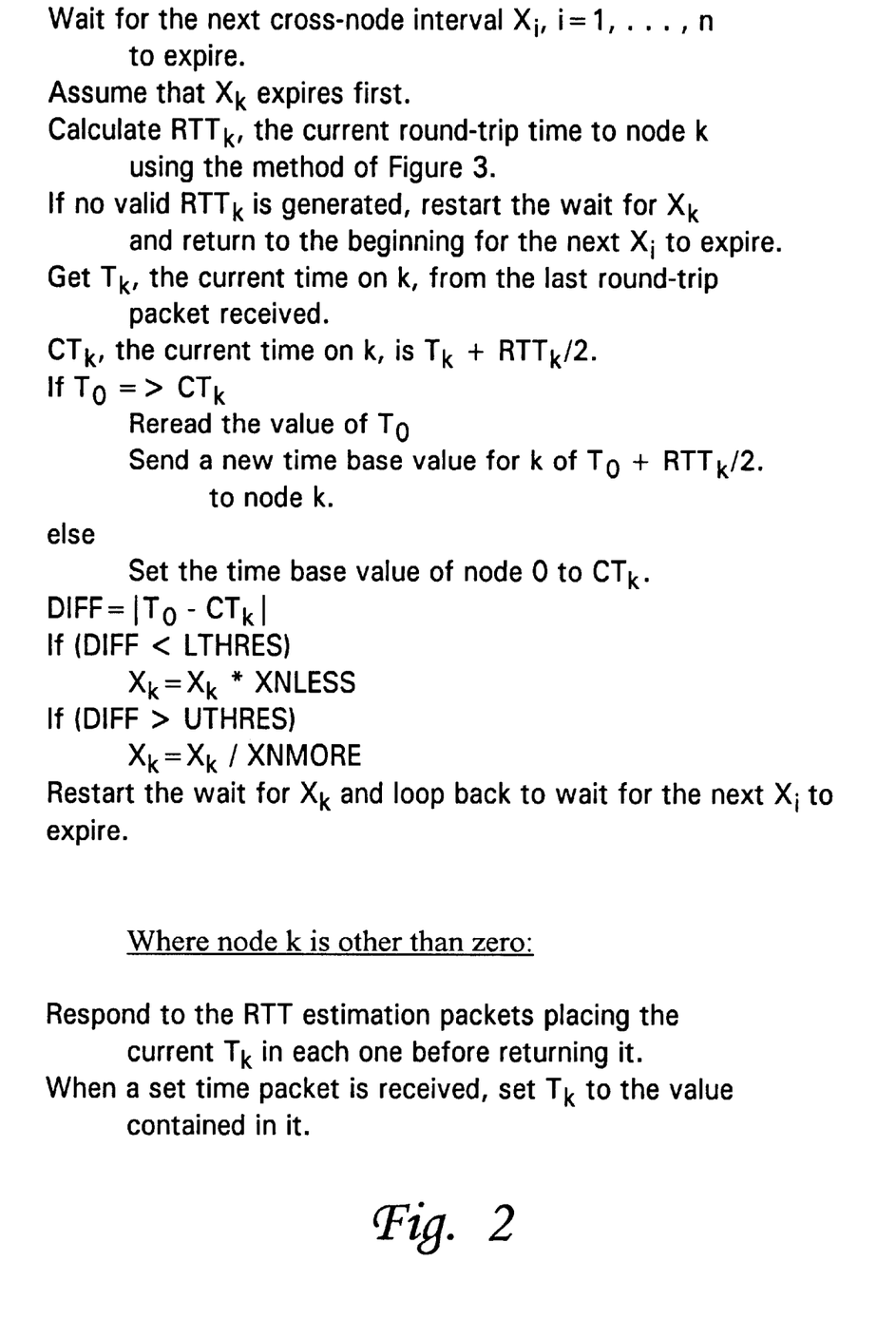
FIG. 2 is an algorithm for synchronizing nodes in a multiple node NUMA system in accordance with an embodiment of the present invention.

Referring to FIG. 2, an algorithm for synchronizing nodes in a multiple node NUMA system in accordance with an embodiment of the present invention is illustrated. The present invention is a modification and extension of an algorithm presented in "Performance Monitoring in a Myrinet-Connected Shrimp Cluster" Cheng Liao, Margaret Martonosi, and Doualas W. Clark, presented at the ACM Sigmetrics Symposium on Parallel and Distributed Tools (SPDT), August 1998. The algorithm, as shown in FIG. 2, presents the two sides of the present invention: one side executes on the node synchronization processor (NSP), that is designated on each node of the NUMA system, of node zero and one that executes on the NSP of each of the other nodes in the NUMA system. Node zero intelligently estimates how long it takes currently to transmit information, in the form of a packet, to some other particular node in the system. Coincidentally, this provides a time value from the designated node to node zero. Based on the transmission time estimate, node zero projects the current time onto the other node, compares that with its time and either updates its own clock to catch up with a leading remote node or sends a new time value to the other node, telling it to advance its time to catch up with that time on node zero. The code on the other nodes is largely passive, responding to the packets coming from node zero and setting the time base value when requested.

In the algorithm shown in FIG. 2, let n be the number of nodes in the system, $E_{rtt}$ be the expected round-trip time value on the interconnect from a node to another node and back again, $STD_{rtt}$ be the standard deviation and $MIN_{rtt}$ be the absolute minimum value of the round-trip time value. Each of the previously described are design time values based on the design of the interconnect mechanism. $D_i$, an observed value, is the drift of the NSP on node i where the sign of $D_i$ indicates the direction of the drift relative to the NSP of node zero. A negative sign indicates that the time base of the NSP of node i is lagging or falling behind that of node zero while a positive sign indicates that the time base is leading or moving ahead of that of node zero.

Re-synchronization is always initiated by node zero and targeted to a particular non-zero node in the system. Re-synchronization interval is adjusted based on how much node zero and the target node are drifting away from each other. Let $X_i$ be the cross-node re-synchronization interval for node i where $X_0$ is not defined. The initial value of $X_i$ is a design time parameter and reflects the anticipated drift values of the time bases of the NSPs on the nodes.

To reduce overhead of synchronization further, the algorithm can reduce the frequency of re-synchronization where possible and increase the frequency when necessary. The adaptation is two-way between node zero and a single target node. Nodes that drift very rapidly versus node zero are re-synchronized more frequently than nodes which drift more slowly. UTHRES is the upper threshold indicating that the error between node zero and the target node is too large and re-synchronization should be more frequent. LTHRES is the lower threshold indicating that the error between node zero and the target is small enough that re-synchronization should be less frequent. XNMORE is the factor used to increase the frequency of cross-node synchronization and XNLESS a factor to decrease the frequency of cross-node synchronization.

Figure 3:
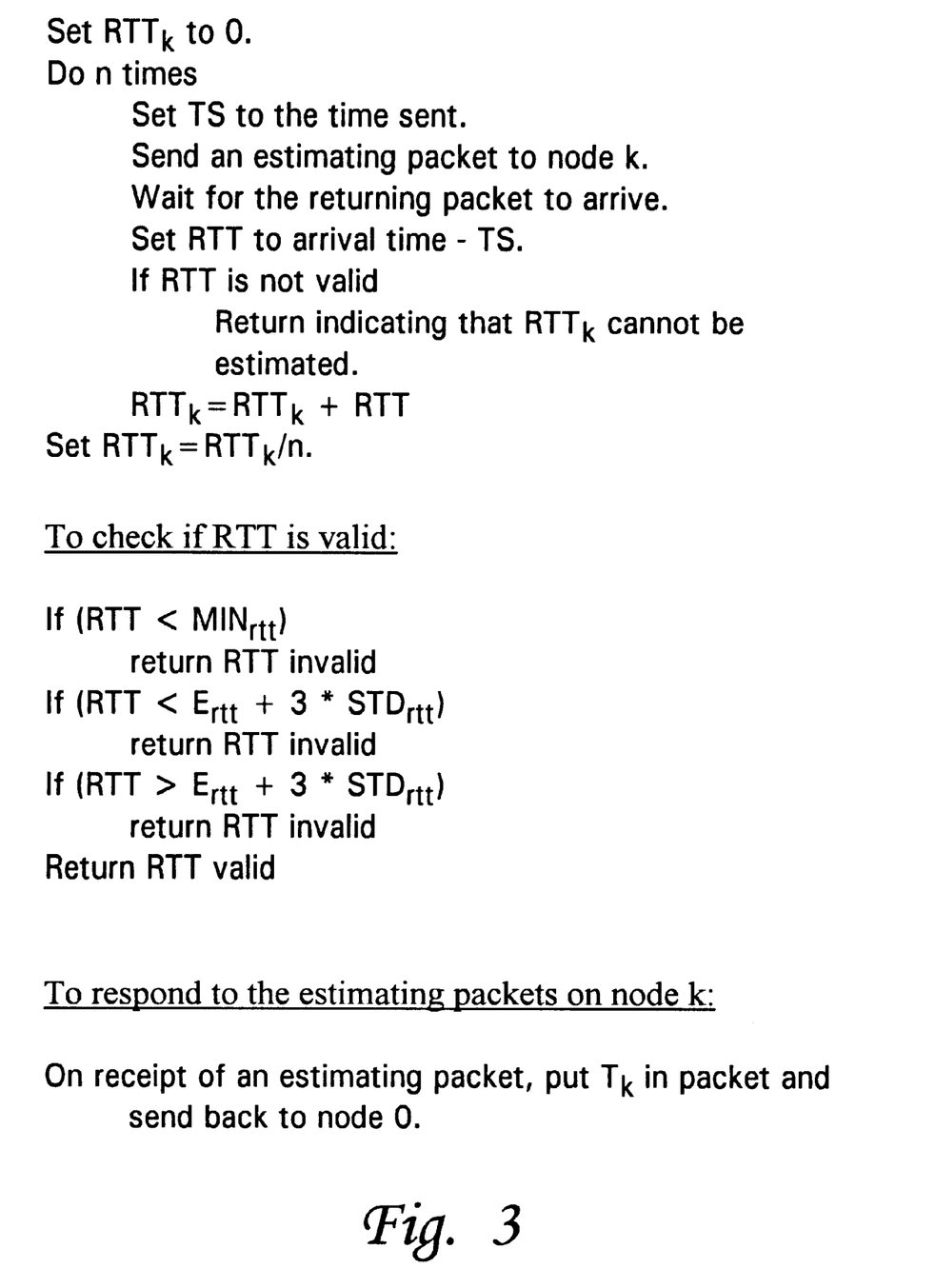
FIG. 3 depicts a calculation of a round trip time from node zero to node k and back in a procedure for synchronizing nodes in a multiple node NUMA system in accordance with an embodiment of the present invention.

Referring now to FIG. 3, a calculation of a round trip time from node zero to node k and back in a procedure for synchronizing nodes in a multiple node NUMA system in accordance with an embodiment of the present invention is illustrated. Mechanisms on node zero and node k that are used to estimate the current value for Round Trip Time to node k ($RTT_k$) must be specified. This RTT value is estimated on every node re-synchronization.

Essentially, the pseudo-code determines an average time by having node zero save TS (the time sent) and sending it to the target node, in this case node k. Node zero receives a responding packet, containing node k time value $T_k$, from node k and RTT is set to the arrival time of the node k packet less TS. If RTT is not valid, e.g., the time is negative, node zero gives up on this re-synchronization and re-starts the wait for the node k synchronization to expire. RTT is compared to three times standard deviation, $STD_{rtt}$ and the absolute minimum value of the round trip time value, $MIN_{rtt}$ to determine further its validity. If RTT is valid, then $RTT_k$ is incremented by RTT. This procedure is repeated n, a fixed number of times determined by the design of the interconnect. At the end of the nth pass, $RTT_k$ value is set to 1/nth of the calculated value.

In the present invention, synchronization is internal to the data processing system. Time values of the time base registers are kept within a relatively small range, but there is no external time source against which the nodes are to be calibrated. There is no particular numerical setting required, therefore, time may be expressed in units of the time base cycles or values. Monotonicity requires that adjustment of a time base register may only increase its value and cannot decrease the value. Hardware generally permits arbitrary values to be set in the time base registers. In particular, changing the time base register does not force it to reset to zero. However, there are processors (e.g., IA-32 processors from Intel, Inc. of San Jose, Calif.) that violate this assumption.

The NUMA system consists of multiple, interconnected nodes. The interconnect has well-defined, design-specified values of the expected value of the round-trip time for a packet sent from one node to another and returned to the originating node and the standard deviation of the round-trip time. There is also a well-defined, absolute minimum round-trip time. Moreover, the interconnect is assumed to be approximately symmetric, so if the round-trip time is RTT, the transit time from the sending node to the target node is RTT/2.

Each NUMA node may be an SMP system and there is a designed node zero in the NUMA system which acts as the manager in the synchronization algorithm. The present invention synchronizes NSPs in the system and it is assumed that some pre-existing mechanism synchronizes the remaining processors in a node to the node's NSP. Each node of the NUMA system has a designated NSP processor that participates in synchronization. Every NSP may have its own oscillator and the NSP time base registers may drift forward or backward relative to each other. Typically, the oscillators are accurate and the rate of drift is small.

Figure 4:
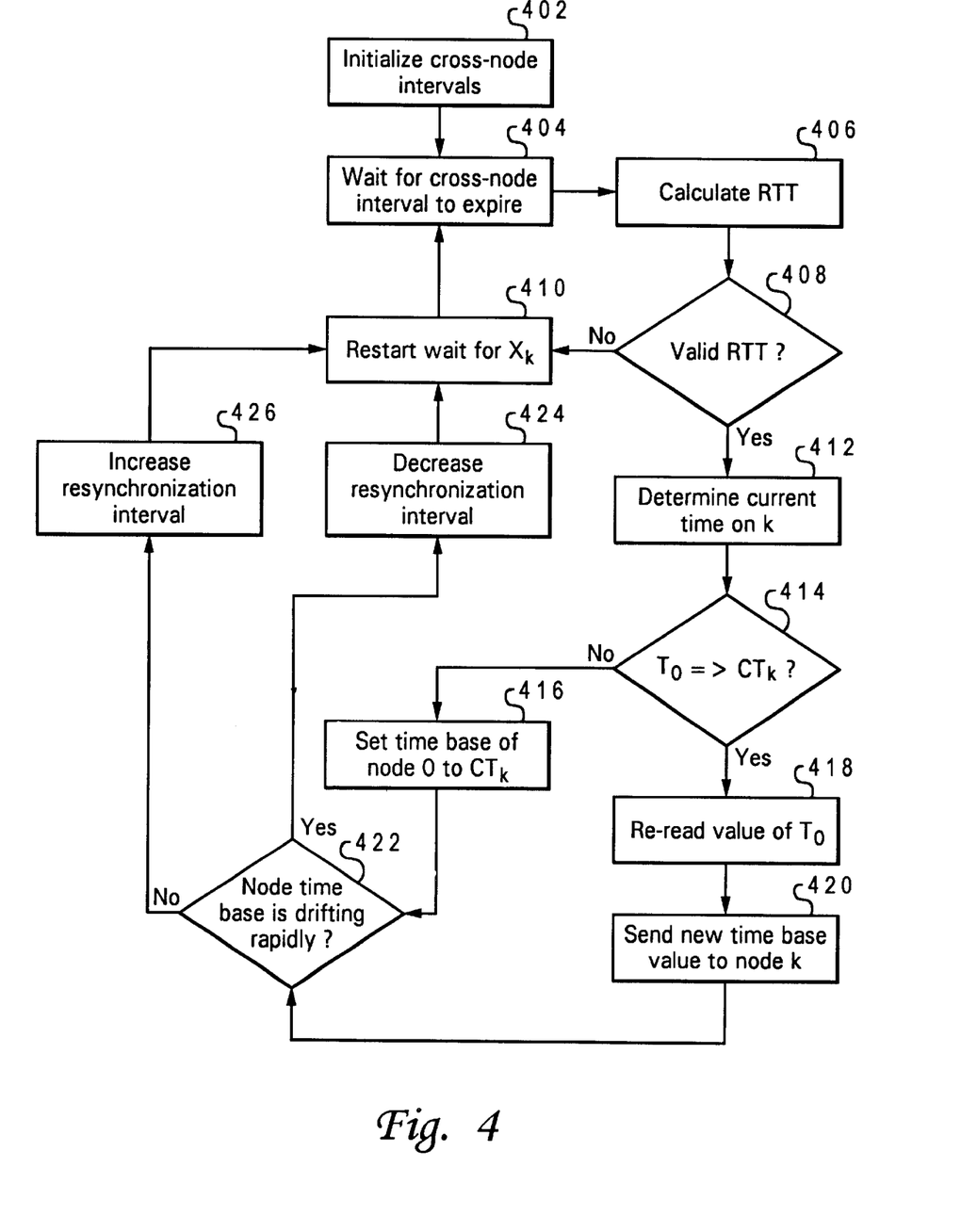
FIG. 4 is a process for synchronizing nodes in a multiple node NUMA system in accordance with an embodiment of the present invention.

Referring now to FIG. 4, a method for synchronizing nodes in a multiple node NUMA system in accordance with an embodiment of the present invention is illustrated. Refer to FIG. 2 for a pseudo-code structure of the present invention. The process begins with step 402, which illustrates initialization of cross node intervals. The process then proceeds to step 404, which depicts waiting for a particular cross node interval to expire. In this case, cross node interval k expires first. The process proceeds to step 406, which illustrates the estimation of Round Trip Time ($RTT_k$) between node zero and node k. This estimate is accomplished utilizing the method illustrated in FIG. 3.

The process next proceeds to step 408, which depicts a determination of whether step 406 produced a valid $RTT_k$ estimate. Synchronization relies on an accurate estimate of the time that it will take for a packet carrying time information to arrive at its destination. Since this can be affected by various network conditions, recent packet round-trip times to estimate the delivery time of the next packet are utilized. If the packet round-trip times are normally distributed around their design-time expected value, almost all of them will be within three standard deviations of the design-time expected value. Utilizing multiple valid estimating packets is important to ensure that the value of $RTT_k$ is one that predicts the behavior of the next packet sent.

If the determination is made that $RTT_k$ is not valid, the process passes to step 410, which depicts restarting the wait for cross-node interval k ($X_k$). If the determination is made that $RTT_k$ is valid the process instead passes to step 412, which illustrates the system determining the current time on node k. Next the process passes to step 414, which depicts a determination of whether $T_0$ is less than or equal to the current time of node k ($CT_k$). If the time on node zero, $T_0$, is less than or equal to the current time on node k, the process proceeds to step 416, which illustrates setting the time base of node zero to the current time of node k. If the determination is made, in step 414 that time on node zero is greater than the time on node k, the process passes instead to step 418, which depicts re-reading the time value from the time base register on node zero. The process continues to step 420, which illustrates sending the new time base value to node k, thus re-synchronizing node k with node zero.

The process then passes to step 422, which depicts a determination of how rapidly the node time bases are drifting apart rapidly. If the node time base is drifting apart rapidly, the process proceeds to step 426, which illustrates decreasing re-synchronization intervals since the error between node zero and the target node is too large. The process then passes to step 410.

If the node time base is not drifting apart rapidly, the process passes instead to step 424, which depicts increasing the re-synchronization interval because the error between node zero and the target node is small and re-synchronization should be less frequent. The process then moves to step 410, which depicts restarting the wait cycle for $X_k$, the cross-node synchronization interval for node k. The process continues to step 404, which illustrates waiting for the cross-node interval to expire and repeating the re-synchronization process.

The present invention relies on an accurate estimate of the time it will take for a packet, carrying time information, to arrive at its destination. Since the time may be affected by various network conditions, the algorithm uses recent packet round-trip times to estimate the delivery time of the next packet. The present invention avoids re-synchronization during periods of serious overload by omitting re-synchronizations when they are detected. If the packet round-trip times are normally distributed around the design-time expected value, most of the packets will be within three standard deviations of the value. Since the drift is small, the interconnect must be severely overloaded for significant drift to occur. Using a small number of estimating packets is important to ensure that the value of $RTT_k$ predicts the behavior of the next packet sent.

The present invention maintains the nonotonicity of the time bases by always advancing the earlier of the two time bases to catch up to the later one. Adjusting node zero may create a temporary drift away by the time bases on other nodes, but that is corrected at the next re-synchronization. If the drift is small, the adjustments in time base value also tend to be small. A feature may be added to the present invention to allow a node to predict how it is drifting relative to node zero.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMS) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for monotonic time synchronization in a multi-node data processing system, comprising the steps of:
   designating one of n number of nodes as node zero;
   initiating re-synchronization;
   estimating a period of time necessary for transmitting data from said node zero to a target node in said multi-node data processing system;
   updating said node zero time if said target node time is leading said node zero time;
   updating said target node time if said node zero time is leading said target node time; and
   repeating previous said steps for all other nodes in said multi-node data processing system.

2. The method in claim 1, wherein estimating said period of time necessary for transmitting data from said node zero to a target node in said multi-node data processing system, further comprises:
   noting time at said node zero and sending a data packet from said node zero to said target node;
   noting, at said node zero, the arrival time of said data packet at said target node;
   calculating packet transit time by subtracting the time said packet was sent from the time said packet arrived at said target node;
   determining validity of said transit time;
   iterating transit time calculations a predetermined number of times; and
   averaging results of said transit time calculations.

3. The method in claim 2, wherein determining validity of transit time calculations, further comprises:
   comparing each round trip time estimate with a known minimum value and expected value less three times the standard deviation and an expected value plus three times the standard deviation, wherein said minimum value, standard deviation and expected value are known from design-time information.

4. The method in claim 2, further comprising:
   receiving a time base value from said target node;
   discarding all response packets except final said response packet; and
   adjusting said time base value on said node zero or said target node based on a comparison of the time value with said time value received from said target node.

5. The method in claim 4, further comprising:
   adjusting a re-synchronization interval based on a determination of the speed with which said target node time base is drifting away from said node zero time base.

6. The method in claim 5, further comprising:
   re-synchronizing nodes more frequently when said target node time base drifts rapidly with respect to said node zero time base; and
   re-synchronizing nodes less frequently when said target node time base drifts slowly with respect to said node zero time base.

7. A computer program product within a computer readable medium having instructions for monotonic time synchronization in a multi-node data processing system, comprising the steps of:
   instructions within said computer program product for designating one of n number of nodes as node zero;
   instructions within said computer program product for initiating re-synchronization;
   instructions within said computer program product for estimating a period of time necessary for transmitting data from said node zero to a target node in said multi-node data processing system;
   instructions within said computer program product for updating said node zero time if said target node time is leading said node zero time;
   instructions within said computer program product for updating said target node time if said node zero time is leading said target node time; and
   instructions within said computer program product for repeating said steps on all other nodes in said multi-node data processing system.

8. The computer program product in claim 7, wherein instructions for estimating said period of time necessary for transmitting data from said node zero to a target node in said multi-node data processing system, further comprises:
   instructions within said computer program product for noting time at said node zero and sending a data packet from said node zero to said target node;
   instructions within said computer program product for noting, at said node zero, the arrival time of said data packet at said target node;
   instructions within said computer program product for calculating packet transit time by subtracting the time said packet was sent from the time said packet arrived at said target node;
   instructions within said computer program product for determining validity of said transit time;
   instructions within said computer program product for iterating transit time calculations a predetermined number of times; and
   instructions within said computer program product for averaging results of said transit time calculations.

9. The computer program product in claim 8, wherein instructions for determining validity further comprises:
   instructions within said computer program product for comparing each round trip time estimate with a known minimum value, an expected value less three times the standard deviation and an expected value plus three times the standard deviation, wherein said minimum value, standard deviation and expected value are known from design-time information.

10. The computer program product in claim 8, further comprising:
    instructions within said computer program product for receiving a time base value from said target node;
    instructions within said computer program product for disregarding all response packets except final said response packet; and
    instructions within said computer program product for adjusting said time base value on said node zero or said target node based on a comparison of the time value with said time value received from said target node.

11. The computer program product in claim 8, further comprising:
    instructions within said computer program product for adjusting a re-synchronization interval based on a determination of the speed with which said target node time base is drifting away from said node zero time base.

12. The computer program product in claim 11, further comprising:
    instructions within said computer program product for re-synchronizing nodes more frequently when said target node time base drifts rapidly with respect to said node zero time base; and instructions within said computer program product for re-synchronizing nodes less frequently when said target node time base drifts slowly with respect to said node zero time base.

13. A multi-node data processing system, comprising:

a system interconnect for transmitting data;

n number of nodes wherein each node comprises:
- a plurality of processors connected to a local bus;
- at least one memory connected to said local bus for storing said data; and
- a controller connected to said local bus for controlling said memory, wherein said controller is also connected to a said system interconnect;

a register within each of said plurality of processors for recording and reporting time values in each of said plurality of nodes;

a designated node zero; and logic means for synchronizing time values between said n number of nodes.

14. The multi-node data processing system of claim 13, wherein said logic means for synchronizing time values between said n number of nodes, further comprises:

discrimination means for designating one of n number of nodes as node zero;

means for initiating synchronization;

calculation means for estimating a period of time necessary for transmitting data from said node zero to a target node in said multi-node data processing system;

validation means for determining validity of said transit time;

update means for updating said node zero time if said target node time is leading said node zero time;

means for updating said target node time if said node zero time is leading said target node time; and logic means for setting a time base value on all other nodes in said multi-node data processing system.

15. The multi-node data processing system in claim 14, wherein said validation means for determining validity, further comprises:

discrimination means for comparing each round trip time estimate with a calculation wherein said calculation comprises:
- a known minimum value, an expected value less three times a standard deviation and an expected value plus three times said standard deviation, wherein said minimum value, said standard deviation and said expected value are known from design-time information.

16. The multi-node data processing system in claim 14, wherein said estimating means for estimating said period of time necessary for transmitting data from said node zero to a target node in said multi-node data processing system, further comprises:

transmission means for sending a data packet from said node zero to said target node;

means for receiving a time value from said target node at said node zero; and discrimination means for comparing said target node time to said node zero time.

17. The multi-node data processing system in claim 14, further comprising:

logic means for adjusting time base value on said node zero or said target node based on said time value received from said target node.

18. The multi-node data processing system in claim 17, further comprising:

logic means for adjusting a re-synchronization interval based on a determination of the speed with which said target node time base is drifting away from said node zero time base.

19. The multi-node data processing system in claim 18, further comprising:

synchronization means for re-synchronizing nodes more frequently when said target node time base drifts rapidly with respect to said node zero time base; and synchronization means for re-synchronizing nodes less frequently when said target node time base drifts slowly with respect to said node zero time base.

* * * * *

UNITED STATES PATENT AND TRADEMARK OFFICE
CERTIFICATE OF CORRECTION

PATENT NO. : 6,502,141 B1
DATED : December 31, 2002
INVENTOR(S) : Rawson, III

It is certified that error appears in the above-identified patent and that said Letters Patent is hereby corrected as shown below:

Title page,
Please insert: Item -- [74] *Attorney, Agent or Firm* – Casimer K. Salys; Bracewell & Patterson, L.L.P. --

Column 8,
Lines 48-51, replace with -- instructions within said computer program product for discarding all response packets except final said response packet; and --

Signed and Sealed this

Fifth Day of August, 2003

JAMES E. ROGAN
*Director of the United States Patent and Trademark Office*